US009679292B2

(12) United States Patent
Bauchot et al.

(10) Patent No.: US 9,679,292 B2
(45) Date of Patent: *Jun. 13, 2017

(54) CORRELATING QUESTIONS AND ANSWERS IN AN INSTANT MESSAGING ENVIRONMENT

(71) Applicant: International Business Machines Corporation, Armonk, NY (US)

(72) Inventors: Frederic Bauchot, Saint-Jeannet (FR); Jean-Yves Clement, Saint-Jeannet (FR); Gerard Marmigère, Drap (FR); Joaquin Picon, Saint-Laurent-du-Var (FR)

(73) Assignee: International Business Machines Corporation, Armonk, NY (US)

(*) Notice: Subject to any disclaimer, the term of this patent is extended or adjusted under 35 U.S.C. 154(b) by 215 days.

This patent is subject to a terminal disclaimer.

(21) Appl. No.: 14/553,003

(22) Filed: Nov. 25, 2014

(65) Prior Publication Data

US 2015/0082202 A1  Mar. 19, 2015

Related U.S. Application Data

(63) Continuation of application No. 12/211,287, filed on Sep. 16, 2008, now Pat. No. 9,117,211.

(30) Foreign Application Priority Data

Aug. 4, 2008  (EP) ................................. 08305446

(51) Int. Cl.
G06F 15/16 (2006.01)
G06Q 20/40 (2012.01)
H04L 12/58 (2006.01)

(52) U.S. Cl.
CPC .............. *G06Q 20/40* (2013.01); *H04L 51/04* (2013.01); *H04L 51/046* (2013.01); *H04L 51/16* (2013.01)

(58) Field of Classification Search
CPC ................................. H04L 51/16; H04L 51/04
See application file for complete search history.

(56) References Cited

U.S. PATENT DOCUMENTS 6,539,421 B1  3/2003  Appelman et al.
6,907,447 B1  6/2005  Cooperman et al.
(Continued)

FOREIGN PATENT DOCUMENTS

WO  2008034649 A1  3/2008

OTHER PUBLICATIONS

Notice of Allowance (Mail date Aug. 20, 2014) for U.S. Appl. No. 12/211,287, Conf. No. 8155.
(Continued)

*Primary Examiner* — Brian Whipple
(74) *Attorney, Agent, or Firm* — Schmeiser, Olsen & Watts, LLP; John Pivnichny

(57) ABSTRACT

A method and system for utilizing an instant messaging environment. An instant messaging client is created in association with each respective end user of at least two end users. Each instant messaging client in association with its respective end user includes at least two zones. Each zone corresponds exclusively to a unique end user. Each zone includes at least two textboxes contiguously distributed within each zone. The at least two zones of each instant messaging client is configured to include a write-only zone specific to the respective end user and a read-only zone specific to each end user of all other end users exclusive of
(Continued)

the respective end user. Each instant messaging client is provided to each respective end user of the at least two end users.

20 Claims, 8 Drawing Sheets

(56) References Cited

U.S. PATENT DOCUMENTS

| | | |
|---|---|---|
| 7,039,677 B2 | 5/2006 | Fitzpatrick et al. |
| 7,284,207 B2 | 10/2007 | Canfield et al. |
| 7,328,242 B1 | 2/2008 | McCarthy et al. |
| 7,380,212 B2 | 5/2008 | Cody et al. |
| 7,487,455 B2 | 2/2009 | Szeto |
| 2004/0228531 A1 | 11/2004 | Fernandez et al. |
| 2005/0050143 A1 | 3/2005 | Gusler et al. |
| 2005/0149620 A1 | 7/2005 | Kirkland et al. |
| 2005/0235034 A1 | 10/2005 | Chen et al. |
| 2005/0262199 A1 | 11/2005 | Chen et al. |
| 2006/0031375 A1 | 2/2006 | Danker et al. |
| 2006/0059235 A1 | 3/2006 | Peterson et al. |
| 2006/0090137 A1 | 4/2006 | Cheng et al. |
| 2008/0028027 A1 | 1/2008 | Jachner |
| 2008/0040436 A1 | 2/2008 | Setlur et al. |
| 2008/0208984 A1 | 8/2008 | Rosenberg et al. |
| 2009/0150490 A1 | 6/2009 | Gile et al. |

OTHER PUBLICATIONS 312 amendment (Oct. 29, 2014) for U.S. Appl. No. 12/211,287, Conf. No. 8155.

Amendment (Aug. 6, 2014) for U.S. Appl. No. 12/211,287, Conf. No. 8155.

Office Action (Mail date May 21, 2014) for U.S. Appl. No. 12/211,287, Conf. No. 3155.

Amendment (Aug. 26, 2013) for U.S. Appl. No. 12/211,287, Conf. No. 8155.

RCE (Feb. 10, 2011) for U.S. Appl. No. 12/211,287, Conf. No. 8155.

Final Office Action (Mail date Nov. 24, 2010) for U.S. Appl. No. 12/211,287, Conf. No. 8155.

Amendment (Sep. 13, 2010) for U.S. Appl. No. 12/211,287, Conf. No. 8155.

Office Action (Mail date Jun. 15, 2010) for U.S. Appl. No. 12/211,287, Conf. No. 3155.

CORRELATING QUESTIONS AND ANSWERS IN AN INSTANT MESSAGING ENVIRONMENT

This application is a continuation application claiming priority to Ser. No. 12/211,287, filed Sep. 16, 2008, now U.S. Pat. No. 9,117,211 B2, issued Aug. 25, 2015.

BACKGROUND OF THE INVENTION

The present invention relates generally to instant messaging systems and more particularly to correlating responses to particular questions in an instant messaging system.

Conventional internet-based instant messaging applications operate under the general principle of appending the last statement in a conversation between at least two people to the end of a list of previous statements. These statements collectively are made up of multiple questions, responses, and general remarks.

Under ideal conditions each question posted in the conversation is followed directly by a corresponding answer. However ideal scenarios rarely occur; more often a second question is posted before the first response. The resulting list of statements therefore contains an ambiguity; two questions and a single answer. Is the answer responsive to the first or second question?

Until now, the only solution was for the parties participating in the conversation to provide supplemental statements to clarify the ambiguity. These additional statements unduly lengthen the conversation and would be unnecessary.

SUMMARY OF THE INVENTION

Embodiments of the present invention provide a method, and associated computer program product and computer system, for utilizing an instant messaging environment.

A processor of a computer system creates an instant messaging client in association with each respective end user of at least two end users, each instant messaging client in association with its respective end user comprising at least two zones, each zone of the at least two zones corresponding exclusively to a unique end user of the at least two end users, each zone of the at least two zones comprising a plurality of textboxes contiguously distributed within each zone.

The processor configures the at least two zones comprised by each instant messaging client to include a write-only zone specific to the respective end user and a read-only zone specific to each end user of all other end users of the at least two end users exclusive of the respective end user, each textbox of the plurality of textboxes of the write-only zone configured to include messages originating from only the respective end user, each textbox of the plurality of textboxes of each read-only zone configured to include messages originating from only the other end user to which each read-only zone is specific.

After the configuring, the processor provides each instant messaging client to each respective end user of the at least two end users.

DETAILED DESCRIPTION OF THE DRAWINGS

Although certain embodiments of the present invention are described herein, it is understood modifications may be made to the present invention without departing from its course and scope. Scope of the present invention is not limited to the number of constituting components, the materials thereof, the shapes thereof, the relative arrangement thereof, etc. Furthermore, while the accompanying drawings illustrate certain embodiments of the present invention, such drawings are not necessarily depicted to scale.

Figure 1:
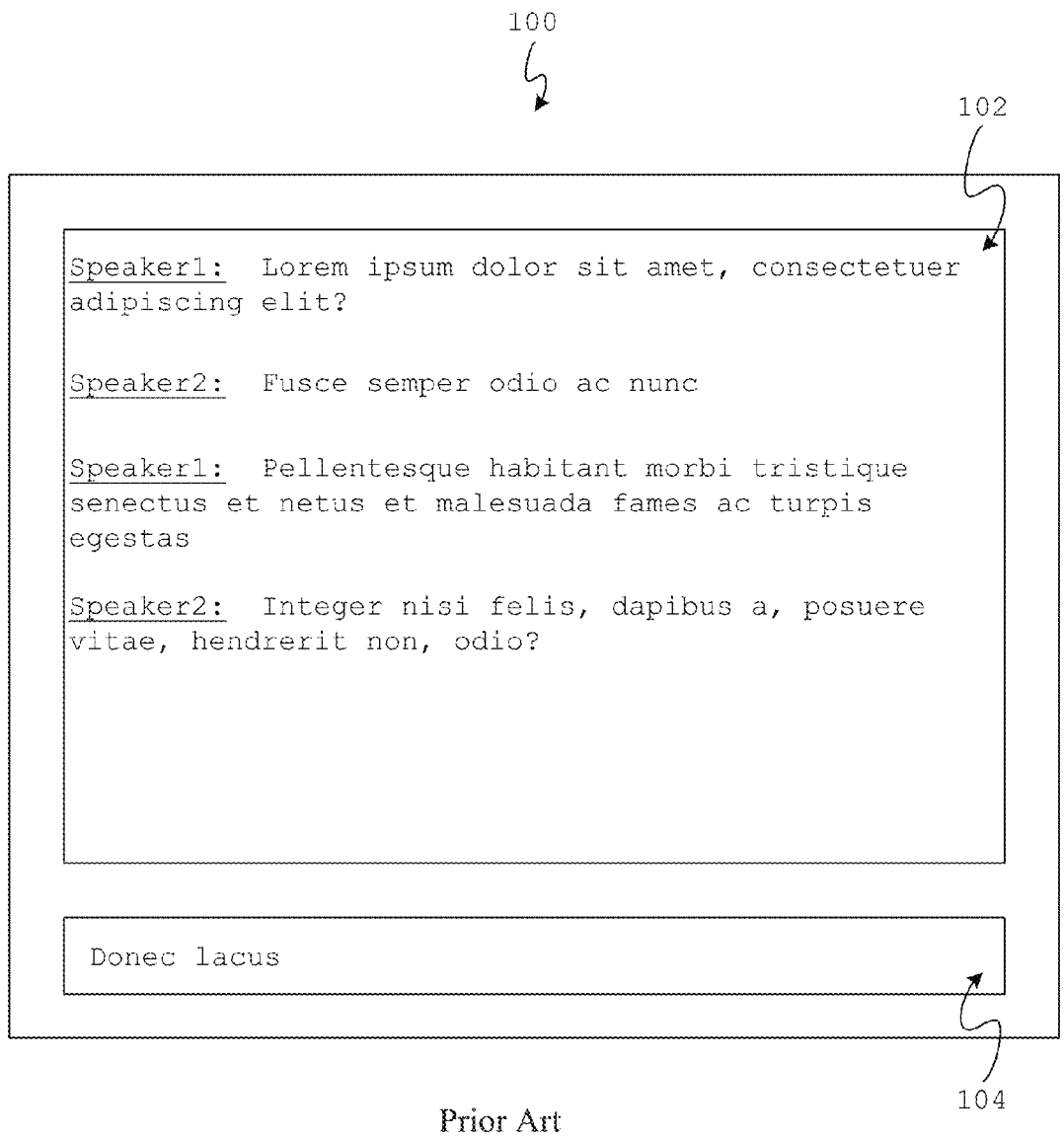
FIG. 1 illustrates a conventional instant messaging client.

FIG. 1 illustrates a conventional instant messaging client 100. The conventional instant messaging client 100 comprises a window 102 and a textbox 104. The Window 102 contains a chronological history of conversations between at least two end users; e.g. Speaker1 and Speaker2 in FIG. 1. The textbox 104 provides an end user, e.g. Speaker1, with a location to enter and submit text to the conversation. Text entered into the textbox 104 is appended to the bottom to the conversation contained in window 102 regardless of which end user (Speaker1 or Speaker2) entered the text. Conventional instant messaging clients 100 also distinguish text entered by different end users usually in a meaningful way; by coloring the text of each end user differently, by prefacing each snippet of the conversation with the end user's name and/or nickname, etc. For example in FIG. 1 each snippet of the conversation contained in the window 102 begins with the name of the end user who submitted the text.

Figure 2A:
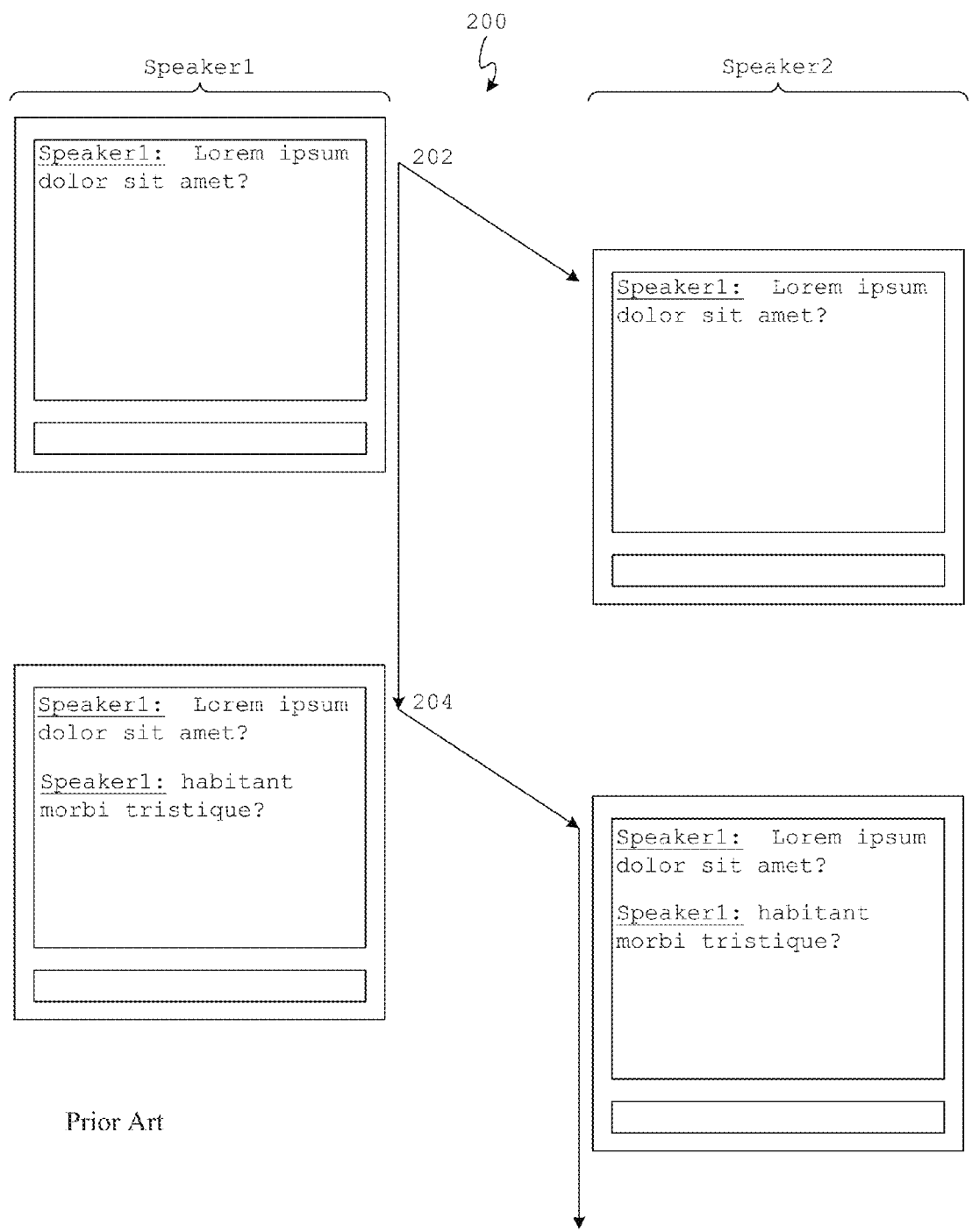
FIG. 2A and FIG. 2B (collectively referred to as FIG. 2) illustrates a typical message flow utilizing a conventional instant messaging system.
Figure 2B:
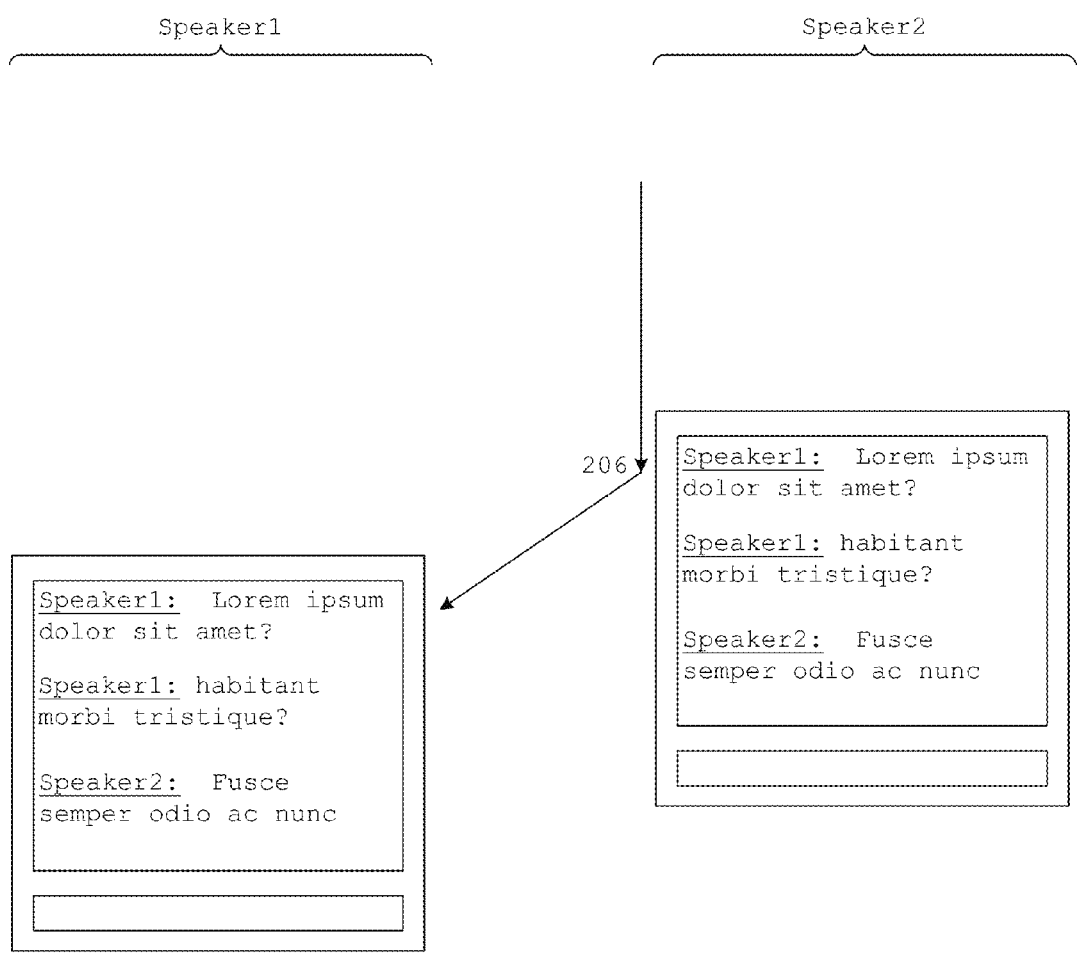

FIG. 2A and FIG. 2B (collectively referred to as FIG. 2) illustrates a typical message flow 200 utilizing a conventional instant messaging system 100 (see FIG. 1, supra). The message flow 200 begins with step 202 when Speaker1 asks a first question of Speaker2. Speaker1 enters the question into the textbox 104 and the question appears both Speaker1 and Speaker2's window 102 residing in separate conventional instant messaging clients 100 (see FIG. 1, supra).

After completion of step 202, the flow 200 continues with step 204 where Speaker1 asks a second question of Speaker2. Again, Speaker1 enters a question into textbox 104 and the text appears appended to the conversation in window 102 of the conventional instant messaging client 100 (see FIG. 1, supra). Note that Speaker2 has yet to respond to Speaker1's original question posted at step 202.

After completion of step 204, the flow 200 continues with step 206 where Speaker2 responds to Speaker1. In step 206 Speaker2 enters a response into the textbox 104 of their conventional instant messaging client 100 and submits the response to Speaker1. Speaker2's response is thereinafter appended to the conversation in the window 102 of both Speaker1 and Speaker2's conventional instant messaging client 100.

The problem with conventional instant messaging clients 100 (see FIG. 1, supra) is depicted in flow 200. It is unclear at step 206 whether Speaker2's answer is responsive to the first question posted by Speaker1 at step 202 or the second question posted at step 204. This ambiguity results in additional messages generated by either Speaker1 or Speaker2 to clarify Speaker2's response and/or correlate the response from step 206 with the appropriate question. The additional messages generated by the ambiguity unduly lengthen the conversation contained in window 102 and restrain immediate correlation between a question and its answer.

Figure 3:
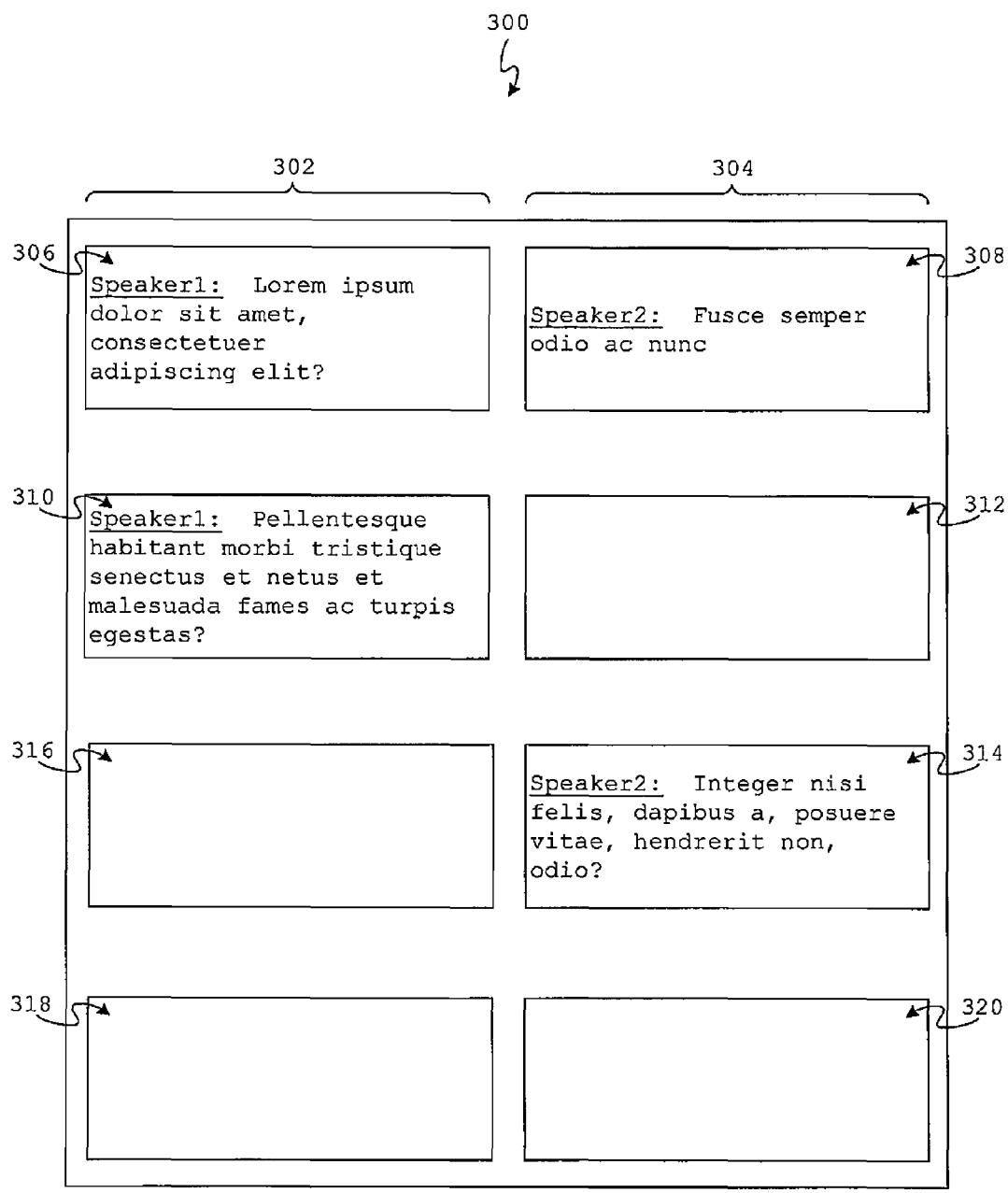
FIG. 3 illustrates an embodiment of the present invention for correlating questions and answers in an instant messaging environment.

FIG. 3 illustrates an embodiment 300 of the present invention for correlating questions and answers in an instant messaging environment. The embodiment 300 comprises two distinct zones: a write-only zone 302 and a read-only zone 304. The write-only zone 302 further comprises at least one textbox 306, 310, 316, and 318. The read-only zone 304 further comprises at least one window 308, 312, 314, and 320. Moreover, each textbox contained within the write-only zone 302 correlates to a unique window contained within the read-only zone 304. For example, textbox 306 correlates to window 308 in the present embodiment 300.

Each end user (Speaker1, Speaker2, etc.) engaged in a conversation enters text into a unique textbox (e.g. textbox 306) contained within the write-only zone 302. To all other conversation participants the text appears in the window corresponding with the selected textbox (e.g. window 308) contained within the read-only zone 304.

With respect to FIG. 3, Speaker1 entered a question into textbox 306 to which Speaker2 responded as detailed in window 308. Textbox 310 contains a question posted by Speaker1 which has yet to be answered by Speaker2, hence window 312 is empty. Since textbox 316 is empty it is clear Speaker1 has yet to respond to the question posted in window 314. Finally, textbox 318 and window 320 are empty and available for either Speaker1 or Speaker2 to initiate another question and/or comment.

A unique and unobvious feature of the present invention captured within the current embodiment 300 is the clear ability for an end user (in this case Speaker1 and Speaker2) to correlate a question with a response. Speaker1's question contained within textbox 306 visually correlates with Speaker2's answer contained within window 308, thus requiring no additional messages.

The conversation depicted in FIG. 3 is with respect to Speaker1's point of view. This is easily identified by the fact that text entered by Speaker1 reside in textboxes (306 and 310) located in the write-only zone 302. Had FIG. 3 depicted the conversation between Speaker1 and Speaker2 with respect to Speaker2's point of view, the text entered by Speaker2 (text contained in windows 308 and 314) would appear in textboxes residing in the write-only zone 302.

Therefore, it is understood that display of the messages utilizing the present invention appear unique to each member of the conversation. It is further understood that each end user engaging in a conversation utilizing the present invention will enter text only into textboxes residing in the write-only zone 302 of their respective instant messaging client.

Figure 4:
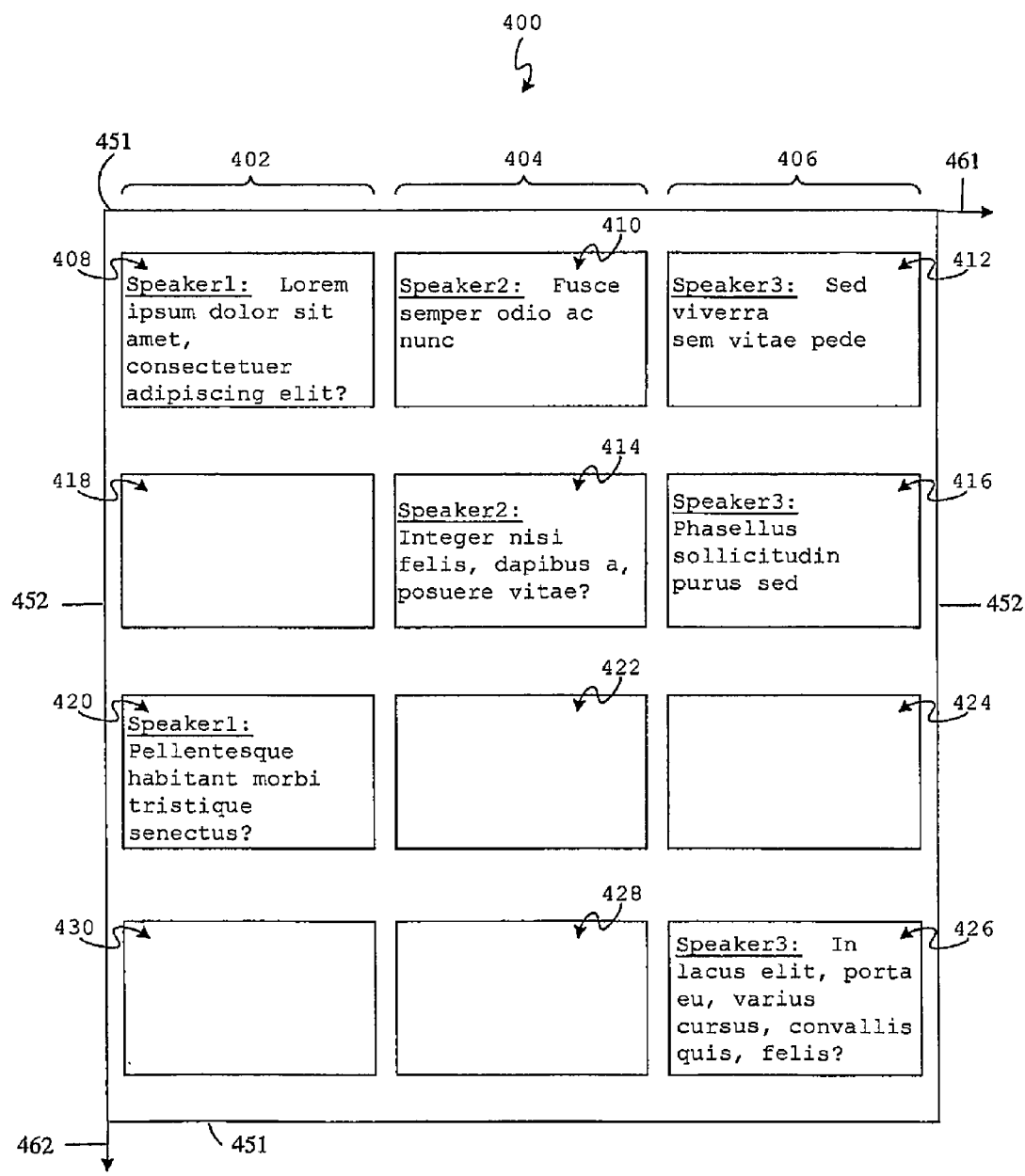
FIG. 4 illustrates an alternative embodiment of the present invention for correlating questions and answers in an instant messaging environment.

FIG. 4 illustrates an alternative embodiment 400 of the present invention for correlating questions and answers in an instant messaging environment. The embodiment 400 enables more than two end users (Speaker1, Speaker2, Speaker3 exemplified in FIG. 4) the ability to maintain a correlation between questions asked and responses provided. The embodiment 400 pertains to an instant messaging client that has been created in association with its end user Speaker1 and comprises three zones: a write-only zone 402, specific to the end user Speaker1, a first read-only zone 404 specific to the end user Speaker2, and a second read-only zone 406 specific to the end user Speaker3. Each end user (Speaker1, Speaker2, and Speaker3) controls their own instance of the present embodiment 400 messenger and can enter text in the write-only zone 402 exclusively. The first read-only zone 404 and second read-only zone 406 are reserved for questions and/or responses posted by other conversation participants as detailed infra. Each zone 402, 404, and 406 corresponds exclusively to the unique end user Speaker1, Speaker2, and Speaker3, respectively. Each zone comprises a plurality of textboxes contiguously distributed within each zone (i.e., textboxes 408, 418, 420, 430 are contiguously distributed within zone 402; textboxes 410, 414, 422, 428 are contiguously distributed within zone 404; textboxes 412, 416, 424, 426 are contiguously distributed within zone 406). Each textbox of the write-only zone 402 is configured to include messages originating from only the end user Speaker1 associated with the instant messaging client of FIG. 4. Each textbox of each read-only zone 404 and 406 is configured to include messages originating from only the end user Speaker2 and Speaker3, respectively, to which each read-only zone is specific. The zones 402, 404, and 406 are in a window having first exterior boundaries 451 and second exterior boundaries 452. The first exterior boundaries 451 are oriented along a first direction 461 and comprise non-overlapping spatial segments in the first direction 461, each spatial segment of first exterior boundaries 451 in the first direction 462 corresponding to one zone of the zones 402, 404, and 406. The second exterior boundaries 452 are oriented in a second direction 462 and comprise non-overlapping spatial segments in the second direction 462, wherein the textboxes in each zone are each within a different non-overlapping spatial segment comprised by the second exterior boundaries 452 (e.g., the textboxes 408, 418, 420, and 430 in zone 402 are each within a different non-overlapping spatial segment comprised by the second exterior boundaries 452). The textboxes of each zone are displaced from each other in the second direction 462 (e.g., in FIG. 4, textboxes 408, 418, 420, 430 in zone 402 are displaced from each other in the second direction 462).

Similarly to the embodiment 300 (detailed with respect to FIG. 3, supra), textboxes are correlated with specific windows, and vice versa. The difference between embodiment 300 and embodiment 400 however is that embodiment 400 has the ability to correlate multiple windows across multiple read-only zones with a single textbox in order to facilitate a conversation with more than two end users. For example, Textbox 408 correlates with both windows 410 and window 412. Similarly, window 412 correlates with textbox 408 and window 410. The visual correlation aspect of the alternative embodiment 400 is similar to the visual correlation detailed in the embodiment 300 with respect to FIG. 3, supra.

FIG. 4 details a conversation between three end users: Speaker1, Speaker2, and Speaker3; viewed with respect to an instant messenger controlled by Speaker1. Textbox 408 contains a question provided by Speaker1 to which windows 410 and 412 are correlated. Window 410 contains Speaker2's response to Speaker1's question posted in textbox 408. Likewise, window 412 contains Speaker3's response to Speaker1's question.

Window 414 contains a question provided by Speaker2 to which window 416 and textbox 418 correlate. Textbox 418 is reserved for Speaker1's response to the question contained in window 414. Window 416 contains Speaker3's response to the question posted by Speaker2 and contained in window 414. Note, the embodiment 400 is detailed as the view of Speaker1, thus Speaker1 cannot modify the contents of window 416 which contains the response provided by Speaker3 or window 414 which contains the question posted by Speaker2.

Textbox 420 contains a question posted by Speaker1 to which windows 422 and 424 correlate, both visually and physically. Since both windows 422 and 424 are empty, it is clear to all involved in the conversation that Speaker2 and Speaker3 have yet to respond to Speaker1's question posted in textbox 420.

Finally, window 426 contains a question provided by Speaker3 to which window 428 and textbox 430 correlate. Since both window 428 and textbox 430 are empty, it is clear to all involved in the conversation that Speaker1 and Speaker2 have yet to respond to Speaker3's question posted in window 426.

The conversation depicted in FIG. 4 is with respect to Speaker1's point of view. This is easily identified by the fact that text entered by Speaker1 reside in textboxes (408 and 420) located in the write-only zone 402. Had FIG. 4 depicted the conversation with respect to Speaker3's point of view, the text entered by Speaker3 (text contained in windows 412, 416, and 426) would appear in textboxes residing in the write-only zone 402.

Figure 5A:
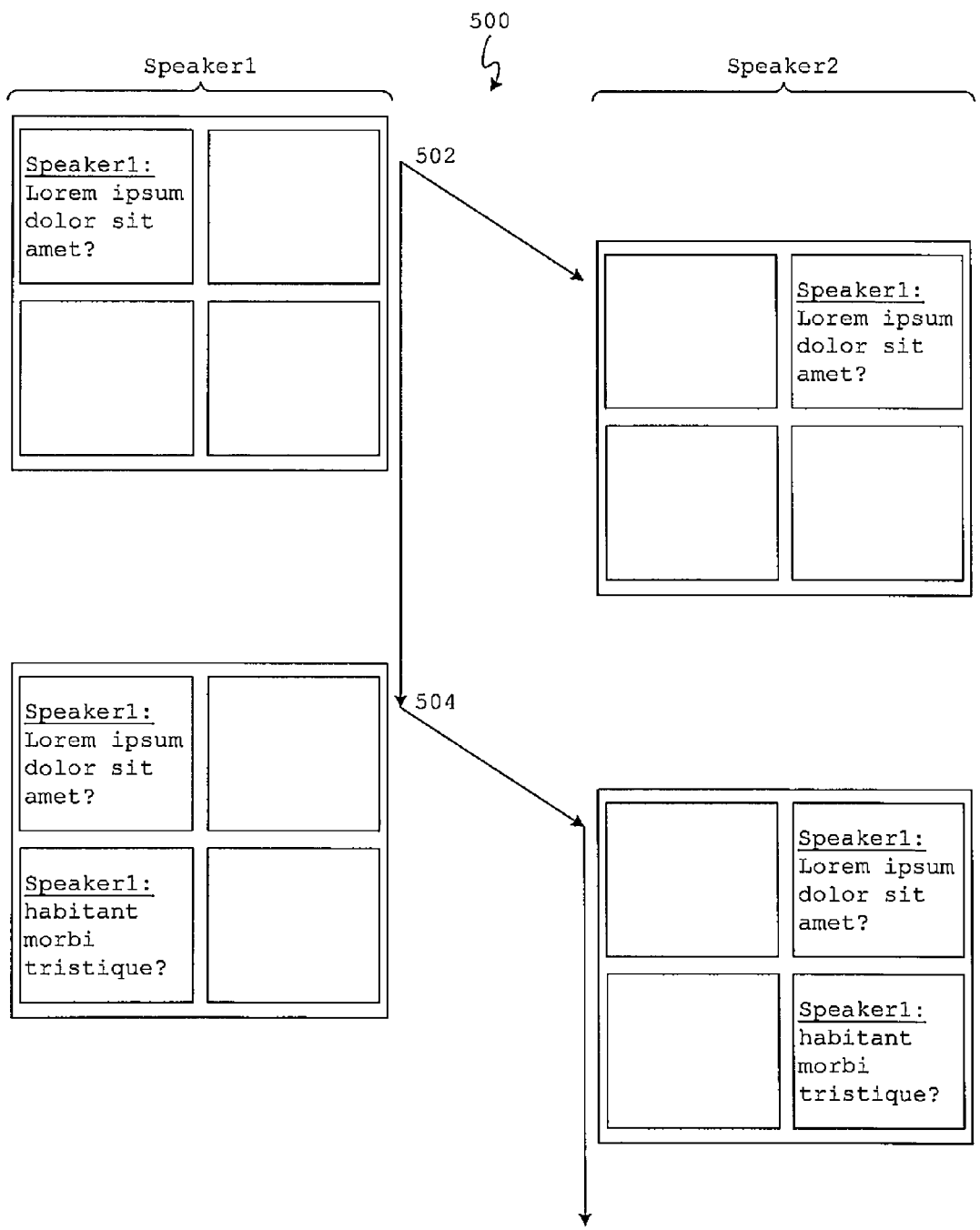
FIG. 5A and FIG. 5B (collectively referred to as FIG. 5) illustrates a message flow depicting a system and method for correlating questions and answers in an instant messaging environment, in accordance with embodiments of the present invention.
Figure 5B:
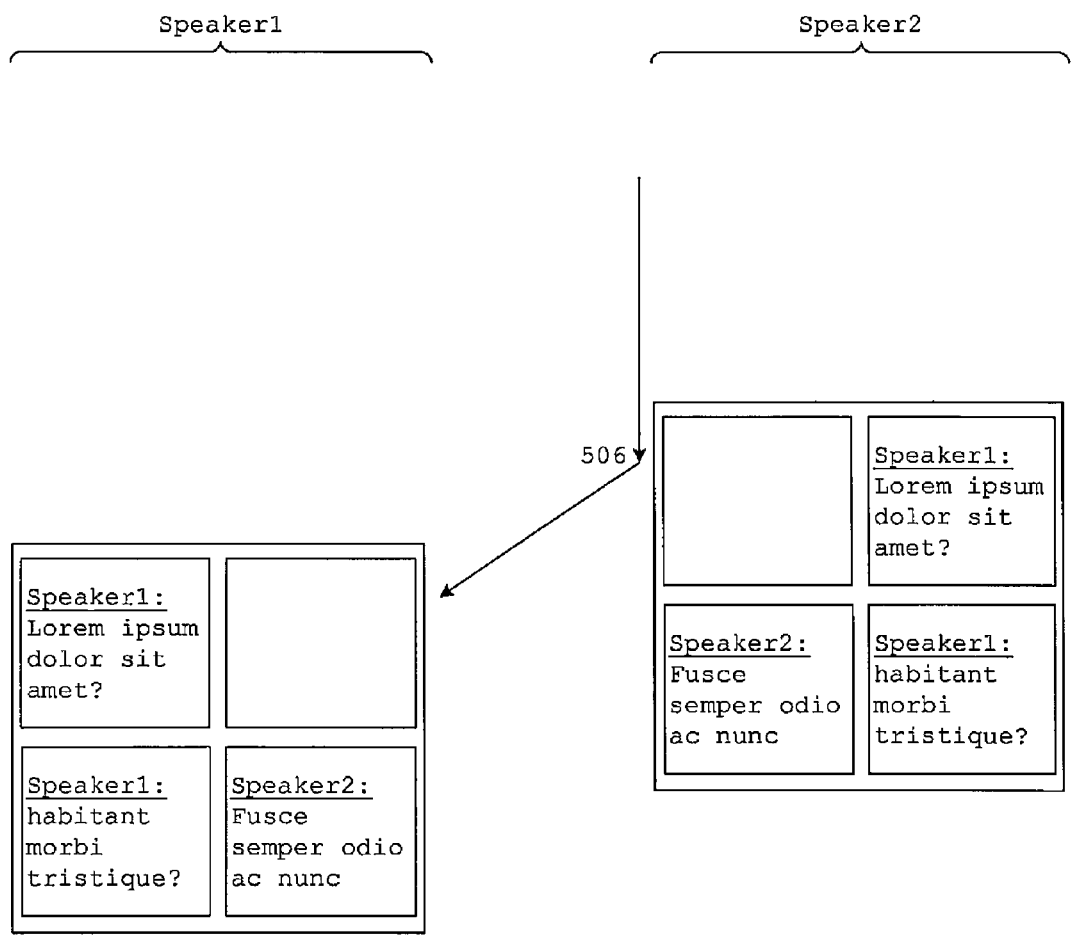

FIG. 5A and FIG. 5B (collectively referred to as FIG. 5) illustrates a message flow 500 depicting a system and method for correlating questions and answers in an instant messaging environment, in accordance with embodiments of the present invention.

The message flow 500 begins with step 502 where an end user (in the example detailed in FIG. 5 the end user is Speaker1) enters a first question into a textbox 306 located in the write-only zone 302 of the present invention. In one embodiment of the present invention, the question entered further contains a first value identifying the specific end user submitting the question and a second value identifying the textbox in which the question was entered.

The first question provided by Speaker1 is transmitted to the other end user participating in the conversation (in the example detailed in FIG. 5, the second end user is Speaker2) and is displayed in the window 308 correlating to the textbox 306, the window 308 residing in the read-only zone 304 of the present invention. In one embodiment of the present invention, the instant messaging client identifies the proper window to display the question by correlating the first value and second value received with the original question to the specific window in the recipient's messaging client.

After completion of step 502, the message flow 500 continues with step 504 where Speaker1 provides a second question (see FIG. 3, supra).

At step 504 Speaker1 provides a second question to the conversation by entering said second question into another textbox 310 residing in the write-only zone 302 of the present invention. The second question is transmitted to Speaker2 and displayed in another window 312 residing in the read-only zone 304 of the present invention. After completion of step 504, the message flow 500 continues with step 506 where Speaker2 responds (see FIG. 3, supra).

At step 506 Speaker2 responds to Speaker1's second question. Speaker2 selects the textbox 310 correlating to the window 312 where Speaker1's second question resides. Speaker2 enters text responsive to Speaker1's second question and the present invention transmits Speaker2's response to Speaker1. The response is displayed in window 312 in the read-only zone 304 of the present invention for Speaker1 to visually correlate with the second question residing in textbox 310 (see FIG. 3, supra).

Figure 6:
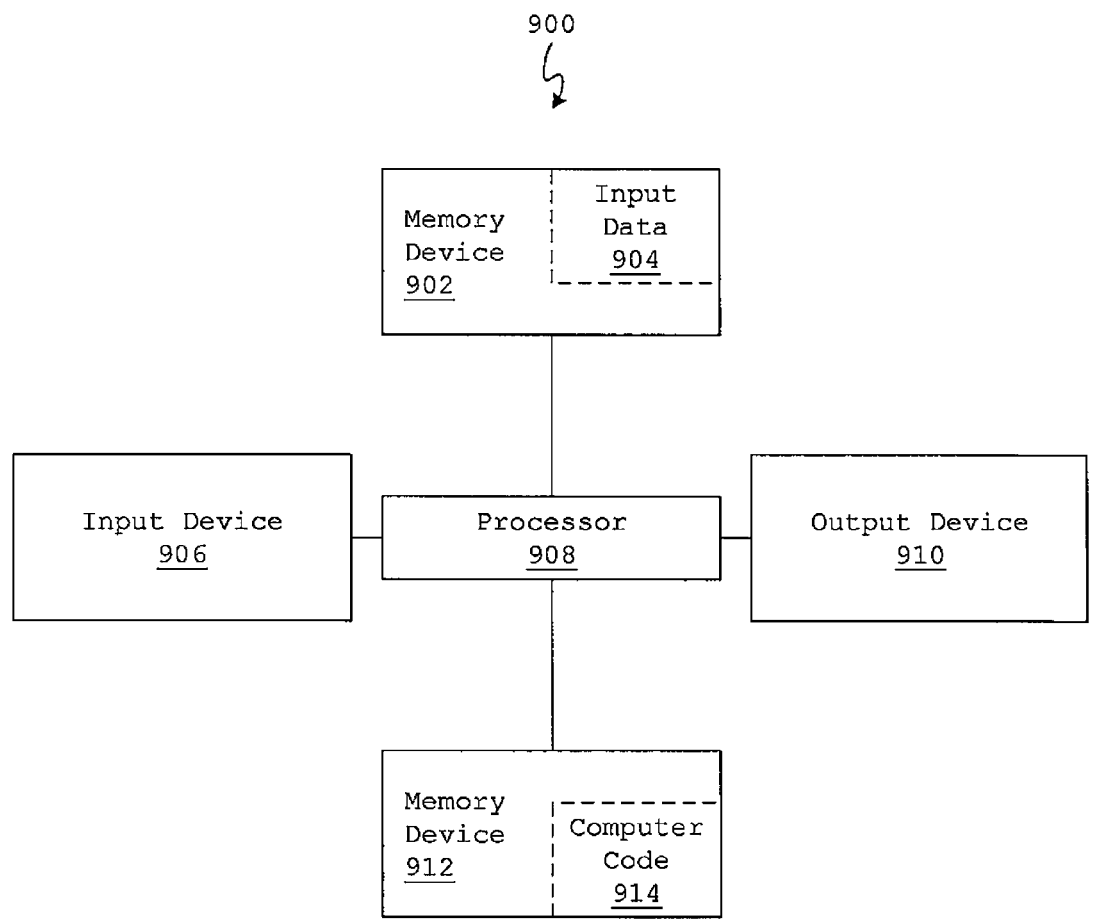
FIG. 6 illustrates a computer system which may facilitate a system and method for correlating questions and answers in an instant messaging environment, in accordance with embodiments of the present invention.

FIG. 6 illustrates a computer system 900 which may facilitate a system and method for correlating questions and answers in an instant messaging environment, in accordance with embodiments of the present invention.

The computer system 900 comprises a processor 908, an input device 906 coupled to the processor 908, an output device 910 coupled to the processor 908, and memory devices 902 and 912 each coupled to the processor 908.

The input device 906 may be, inter alia, a keyboard, a mouse, a keypad, a touchscreen, a voice recognition device, a sensor, a network interface card (NIC), a Voice/video over Internet Protocol (VOIP) adapter, a wireless adapter, a telephone adapter, a dedicated circuit adapter, etc.

The output device 910 may be, inter alia, a printer, a plotter, a computer screen, a magnetic tape, a removable hard disk, a floppy disk, a NIC, a VOIP adapter, a wireless adapter, a telephone adapter, a dedicated circuit adapter, an audio and/or visual signal generator, a light emitting diode (LED), etc.

The memory devices 902 and 912 may be, inter alia, a cache, a dynamic random access memory (DRAM), a read-only memory (ROM), a hard disk, a floppy disk, a magnetic tape, an optical storage such as a compact disc (CD) or a digital video disc (DVD), etc. The memory device 912 includes a computer code 914 which is a computer program that comprises computer-executable instructions.

The computer code 914 includes, inter alia, an algorithm used for correlating questions and answers in an instant messaging environment according to the present invention. The processor 908 executes the computer code 914. The memory device 902 includes input data 904. The input data 904 includes input required by the computer code 914. The output device 910 displays output from the computer code 914. Either or both memory devices 902 and 912 (or one or more additional memory devices not shown in FIG. 6) may be used as a computer usable medium (or a computer readable medium or a program storage device) having a computer readable program embodied therein and/or having other data stored therein, wherein the computer readable program comprises the computer code 914. Generally, a computer program product (or, alternatively, an article of manufacture) of the computer system 900 may comprise said computer usable medium (or said program storage device).

Any of the components of the present invention can be deployed, managed, serviced, etc. by a service provider that offers to deploy or integrate computing infrastructure with respect to a process for correlating questions and answers in an instant messaging environment. Thus, the present invention discloses a process for supporting computer infrastructure, comprising integrating, hosting, maintaining and deploying computer-readable code into a computing system (e.g., computing system 900), wherein the code in combination with the computing system is capable of performing a method for correlating questions and answers in an instant messaging environment.

In another embodiment, the invention provides a business method that performs the process steps of the invention on a subscription, advertising and/or fee basis. That is, a service provider, such as a Solution Integrator, can offer to create, maintain, support, etc. a process for correlating questions and answers in an instant messaging environment. In this case, the service provider can create, maintain, support, etc. a computer infrastructure that performs the process steps of the invention for one or more customers. In return, the service provider can receive payment from the customer(s) under a subscription and/or fee agreement, and/or the service provider can receive payment from the sale of advertising content to one or more third parties.

While FIG. 6 shows the computer system 900 as a particular configuration of hardware and software, any configuration of hardware and software, as would be known to a person of ordinary skill in the art, may be utilized for the purposes stated supra in conjunction with the particular computer system 900 of FIG. 6. For example, the memory devices 902 and 912 may be portions of a single memory device rather than separate memory devices.

While particular embodiments of the present invention have been described herein for purposes of illustration, many modifications and changes will become apparent to those skilled in the art. Accordingly, the appended claims are intended to encompass all such modifications and changes as fall within the true spirit and scope of this invention.

The invention claimed is:

1. A method for utilizing an instant messaging environment, said method comprising:
    creating, by a processor of a computer system, an instant messaging client in association with each respective end user of at least two end users, each instant messaging client in association with its respective end user comprising at least two zones, each zone of the at least two zones corresponding exclusively to a unique end user of the at least two end users, each zone of the at least two zones comprising a plurality of textboxes contiguously distributed within each zone;
    said processor configuring the at least two zones comprised by each instant messaging client to include a write-only zone specific to the respective end user and a read-only zone specific to each end user of all other end users of the at least two end users exclusive of the respective end user, each textbox of the plurality of textboxes of the write-only zone configured to include messages originating from only the respective end user, each textbox of the plurality of textboxes of each read-only zone configured to include messages originating from only the other end user to which each read-only zone is specific; and
    after said configuring, said processor providing each instant messaging client to each respective end user of the at least two end users.

2. The method of claim 1, said method further comprising:
    after said providing each instant messaging client to each respective end user, said receiving, from a first end user of the at least two end users at a first instant messaging client to which the first end user is associated and to which the processor is operationally coupled within the computer system, a first message comprising a first value and a second value and first text, said first value identifying said first end user, said second value identifying a first textbox of the plurality of textboxes located in the write-only zone comprised by the first instant messaging client;
    said processor writing the first text into the first textbox; and
    said processor sending the first message to each receiving instant messaging client associated with the respective end user of the at least two end users exclusive of the first end user.

3. The method of claim 2, each receiving instant messaging client configured to utilize the first value and the second value in the first message to ascertain a second textbox of the plurality of textboxes comprised by each receiving instant messaging client and located in the read-only zone specific to the first end user.

4. The method of claim 2, each receiving instant messaging client further configured to write the first text in the first message into a second textbox comprised by each receiving instant messaging client.

5. The method of claim 2, said method further comprising:
    said processor receiving a second message from a second instant messaging client to which a second end user of the at least two end users is associated, said second message being in response to the first message previously sent by the first instant messaging client to the second instant messaging client, said second message comprising a third value and a fourth value and second text, said third value identifying the second end user, said fourth value identifying a second textbox of the plurality of textboxes located in the write-only zone comprised by the second instant messaging client, said second text having been written into the second textbox;
    said processor utilizing the third value and the fourth value in the second message to ascertain a third textbox of the plurality of textboxes located in a read-only zone specific to the second end user, said first instant messaging client comprising the third textbox; and
    said processor writing the second text into the third textbox.

6. The method of claim 5, wherein said utilizing the third value and the fourth value in the second message to ascertain the third textbox comprises ascertaining that the third textbox and the first textbox are at a same level, and not at a different level, along the second direction, due to the second message being a response to the first message rather than the second message not being in response to the first message.

7. The method of claim 1,
    wherein the at least two zones are in a window having first exterior boundaries and second exterior boundaries, said first exterior boundaries oriented along a first direction, said second exterior boundaries oriented in a second direction, said first and second directions being perpendicular to each other, said first exterior boundaries comprising non-overlapping spatial segments in the first direction, said second exterior boundaries comprising non-overlapping spatial segments in the second direction;
    wherein each zone is totally within a space encompassed by a different non-overlapping spatial segment comprised by the first exterior boundaries;
    wherein the textboxes of each zone are each within a different non-overlapping spatial segment comprised by the second exterior boundaries; and
    wherein the textboxes of each zone are displaced from each other in the second direction.

8. The method of claim 1, said method further comprising:
    providing at least one support service for at least one of creating, integrating, hosting, maintaining, and deploying computer-readable program code in the computer system, said program code being executed by the processor to implement said creating, said configuring, and said sending the first message to each receiving instant messaging client.

9. A computer program product, comprising a computer readable storage medium having a computer-readable program code stored therein, said storage medium not being a signal, said computer-readable program code containing instructions that when executed by a processor of a computer system implement a method for utilizing an instant messaging environment, said method comprising:

said processor creating an instant messaging client in association with each respective end user of at least two end users, each instant messaging client in association with its respective end user comprising at least two zones, each zone of the at least two zones corresponding exclusively to a unique end user of the at least two end users, each zone of the at least two zones comprising a plurality of textboxes contiguously distributed within each zone;

said processor configuring the at least two zones comprised by each instant messaging client to include a write-only zone specific to the respective end user and a read-only zone specific to each end user of all other end users of the at least two end users exclusive of the respective end user, each textbox of the plurality of textboxes of the write-only zone configured to include messages originating from only the respective end user, each textbox of the plurality of textboxes of each read-only zone configured to include messages originating from only the other end user to which each read-only zone is specific; and after said configuring, said processor providing each instant messaging client to each respective end user of the at least two end users.

10. The computer program product of claim 9, said method further comprising:

after said providing each instant messaging client to each respective end user, said receiving, from a first end user of the at least two end users at a first instant messaging client to which the first end user is associated and to which the processor is operationally coupled within the computer system, a first message comprising a first value and a second value and first text, said first value identifying said first end user, said second value identifying a first textbox of the plurality of textboxes located in the write-only zone comprised by the first instant messaging client;

said processor writing the first text into the first textbox; and said processor sending the first message to each receiving instant messaging client associated with the respective end user of the at least two end users exclusive of the first end user.

11. The computer program product of claim 10, each receiving instant messaging client configured to utilize the first value and the second value in the first message to ascertain a second textbox of the plurality of textboxes comprised by each receiving instant messaging client and located in the read-only zone specific to the first end user.

12. The computer program product of claim 10, each receiving instant messaging client further configured to write the first text in the first message into a second textbox comprised by each receiving instant messaging client.

13. The computer program product of claim 10, said method further comprising:

said processor receiving a second message from a second instant messaging client to which a second end user of the at least two end users is associated, said second message being in response to the first message previously sent by the first instant messaging client to the second instant messaging client, said second message comprising a third value and a fourth value and second text, said third value identifying the second end user, said fourth value identifying a second textbox of the plurality of textboxes located in the write-only zone comprised by the second instant messaging client, said second text having been written into the second textbox;

said processor utilizing the third value and the fourth value in the second message to ascertain a third textbox of the plurality of textboxes located in a read-only zone specific to the second end user, said first instant messaging client comprising the third textbox; and said processor writing the second text into the third textbox.

14. The computer program product of claim 13, wherein said utilizing the third value and the fourth value in the second message to ascertain the third textbox comprises ascertaining that the third textbox and the first textbox are at a same level, and not at a different level, along the second direction, due to the second message being a response to the first message rather than the second message not being in response to the first message.

15. A computer system comprising a processor coupled to a computer-readable memory unit, said memory unit comprising a software application, said software application comprising instruction that when executed by said processor, implement a method for utilizing an instant messaging environment, said method comprising:

said processor creating an instant messaging client in association with each respective end user of at least two end users, each instant messaging client in association with its respective end user comprising at least two zones, each zone of the at least two zones corresponding exclusively to a unique end user of the at least two end users, each zone of the at least two zones comprising a plurality of textboxes contiguously distributed within each zone;

said processor configuring the at least two zones comprised by each instant messaging client to include a write-only zone specific to the respective end user and a read-only zone specific to each end user of all other end users of the at least two end users exclusive of the respective end user, each textbox of the plurality of textboxes of the write-only zone configured to include messages originating from only the respective end user, each textbox of the plurality of textboxes of each read-only zone configured to include messages originating from only the other end user to which each read-only zone is specific; and after said configuring, said processor providing each instant messaging client to each respective end user of the at least two end users.

16. The computer system of claim 15, said method further comprising:

after said providing each instant messaging client to each respective end user, said receiving, from a first end user of the at least two end users at a first instant messaging client to which the first end user is associated and to which the processor is operationally coupled within the computer system, a first message comprising a first value and a second value and first text, said first value identifying said first end user, said second value identifying a first textbox of the plurality of textboxes located in the write-only zone comprised by the first instant messaging client;

said processor writing the first text into the first textbox; and said processor sending the first message to each receiving instant messaging client associated with the respective end user of the at least two end users exclusive of the first end user.

17. The computer system of claim 16, each receiving instant messaging client configured to utilize the first value and the second value in the first message to ascertain a second textbox of the plurality of textboxes comprised by each receiving instant messaging client and located in the read-only zone specific to the first end user.

18. The computer system of claim 16, each receiving instant messaging client further configured to write the first text in the first message into a second textbox comprised by each receiving instant messaging client.

19. The computer system of claim 16, said method further comprising:

said processor receiving a second message from a second instant messaging client to which a second end user of the at least two end users is associated, said second message being in response to the first message previously sent by the first instant messaging client to the second instant messaging client, said second message comprising a third value and a fourth value and second text, said third value identifying the second end user, said fourth value identifying a second textbox of the plurality of textboxes located in the write-only zone comprised by the second instant messaging client, said second text having been written into the second textbox;

said processor utilizing the third value and the fourth value in the second message to ascertain a third textbox of the plurality of textboxes located in a read-only zone specific to the second end user, said first instant messaging client comprising the third textbox; and said processor writing the second text into the third textbox.

20. The computer system of claim 19, wherein said utilizing the third value and the fourth value in the second message to ascertain the third textbox comprises ascertaining that the third textbox and the first textbox are at a same level, and not at a different level, along the second direction, due to the second message being a response to the first message rather than the second message not being in response to the first message.

* * * * *